May 31, 1927.  1,630,833
C. F. COWDREY
INDICATING INSTRUMENT
Filed July 9, 1925  2 Sheets-Sheet 1
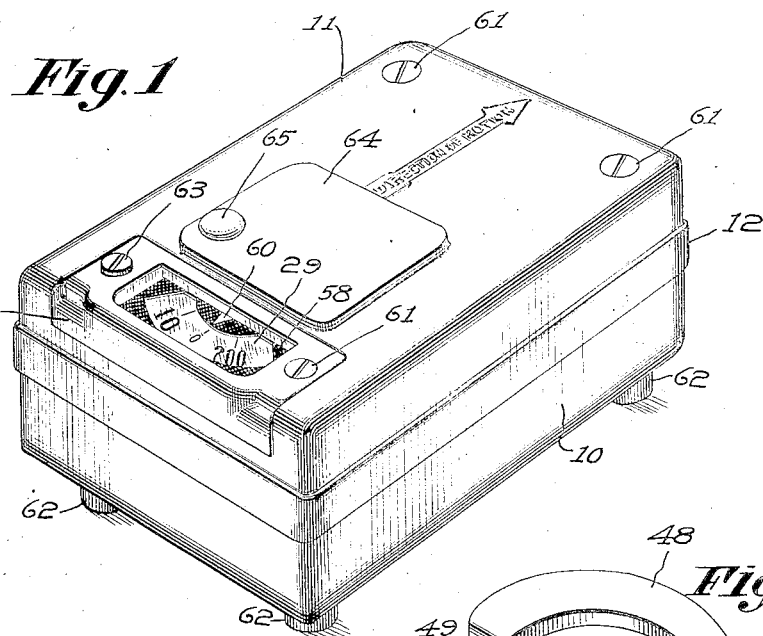
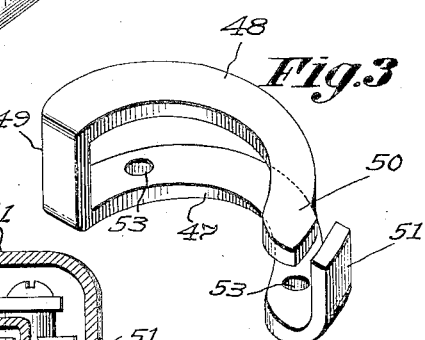
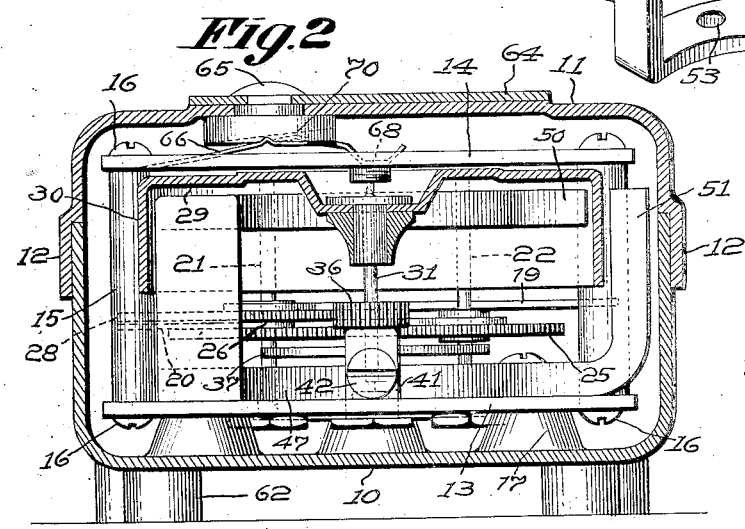
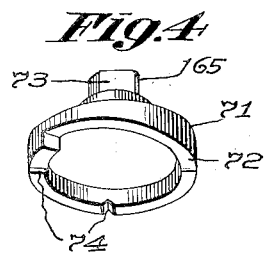
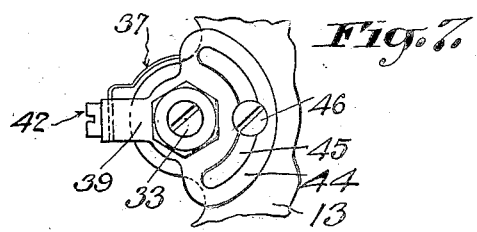
INVENTOR:
Charles F. Cowdrey
BY Robt P. Hains
ATTORNEY May 31, 1927.

C. F. COWDREY 1,630,833

INDICATING INSTRUMENT

Filed July 9, 1925     2 Sheets-Sheet 2

INVENTOR
Charles F. Cowdrey
BY Rob't P. Harris
ATTORNEY

Patented May 31, 1927.

1,630,833

UNITED STATES PATENT OFFICE.

CHARLES F. COWDREY, OF FITCHBURG, MASSACHUSETTS, ASSIGNOR TO MUTHER MANUFACTURING COMPANY, OF BOSTON, MASSACHUSETTS, A CORPORATION OF MASSACHUSETTS.

INDICATING INSTRUMENT.

Application filed July 9, 1925. Serial No. 42,443.

This invention relates to an instrument for testing the brakes of an automobile.

It is extremely important that the brakes of automobiles be kept in good condition and properly adjusted so that they may be relied upon to check the speed of an automobile quickly in case of an emergency.

One practical way of testing the brakes of an automobile is to apply the brakes hard while the automobile is in motion and then note how promptly its speed is checked. Heretofore in testing the brakes of an automobile in this manner it has been customary to drive the automobile at a predetermined speed, say twenty miles per hour, over the road where the test is to be made, and upon reaching a designated point the brakes are applied hard to bring the automobile to rest, the distance the automobile traveled after the brakes were applied is then measured along the roadbed to determine the number of feet the automobile traveled before it stopped.

This method of testing the brakes of an automobile is troublesome and time consuming, and the present invention is therefore directed to an indicating instrument that is constructed to be carried by an automobile the brakes of which are to be tested and which will operate to accurately indicate the speed checking action of the brakes upon the automobile.

The primary features of the present invention reside in a small compact brake testing instrument that may be readily carried upon the person and which is adapted to be placed upon the floor, or other portion of an automobile when a test is to be made, and which is so constructed that it will operate accurately, is not likely to get out of order and is inexpensive to manufacture.

The various features of the invention will be hereinafter described in connection with the accompanying drawings which illustrate a good practical form thereof.

In the drawings:—

Fig. 1 is a perspective view of the complete indicating instrument constructed in accordance with the present invention;

Fig. 2 is a vertical, sectional view, taken substantially on the line 2—2 of Fig. 6;

Fig. 3 is a perspective view of a permanent magnet to be described;

Fig. 4 is a perspective view of a cam which is rotated by the cover plate.

Fig. 7 is a plan view of an adjustable bracket to be described.

Figure 5:
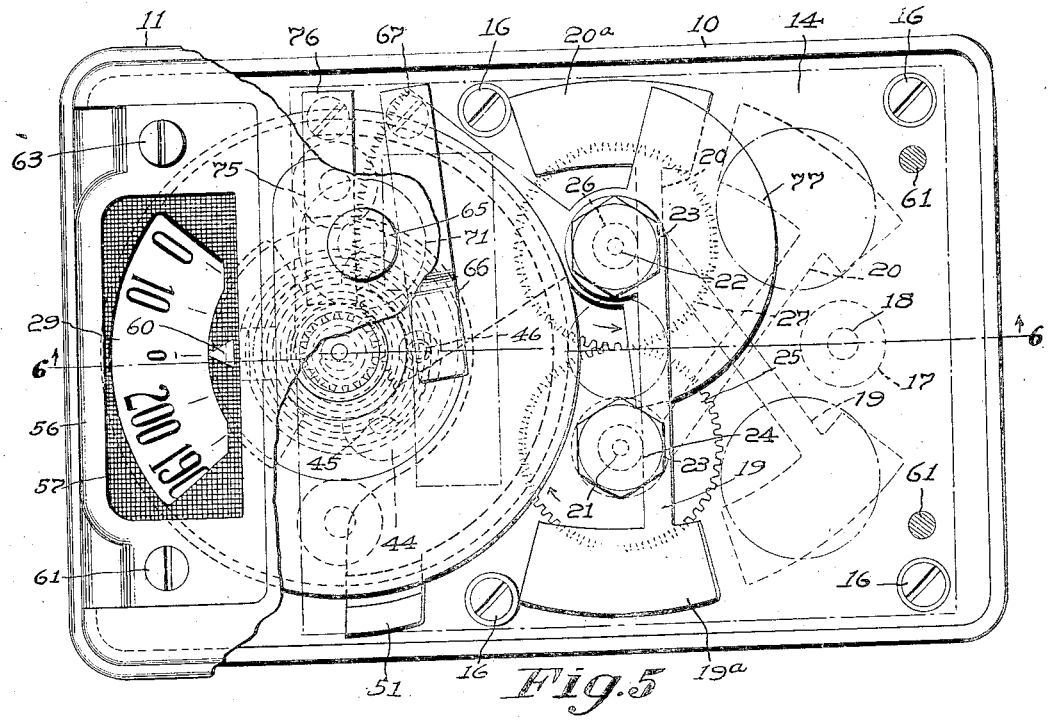
Fig. 5 is a top plan view of the instrument, the major portion of the upper cover being broken away and the upper supporting plate being shown in dot-and-dash lines.

The indicating instrument of the present invention may be permanently secured to the instrument board or other portion of an automobile, but is shown as a portable instrument which may be conveniently carried upon the person and placed upon the floor, running board, or other portion of an automobile when the brakes are to be tested. The operating parts to be described are enclosed in a tight casing to protect them, and this casing as shown consists of a lower hollow receptacle or box 10 conveniently formed of sheet metal and an upper receptacle or box 11 which may also be formed of sheet metal and which has an outer flanged portion 12 which telescopically receives the upper portion of the box 10 so that the two portions of the box when assembled form a tight dust-proof casing in which all operating parts are enclosed.

The various operating parts are preferably supported by a frame consisting of the lower base plate 13 which is supported in spaced relation to the upper plate 14, and these plates are conveniently secured in spaced relation to each other by the posts 15, the opposite ends of which may be internally threaded to receive the screws 16 which extend thru holes in the plates 13 and 14 into threaded engagement with the posts. The arrangement is such that the various operating parts may be assembled in the frame just described and then the frame may be rigidly secured to the lower receptacle or box 10. The box 10 is therefore preferably provided with the inwardly projected portions 17 which may be formed by forcing a portion of the sheet metal of the box inwardly to produce the lugs clearly shown in Fig. 6, and the lower plate 13 is secured to these lugs by screws 18. Three lugs 17 are shown in the drawings, but the number may be varied if desired, and by stamping these lugs inwardly as shown, a recess is provided to receive the heads of these screws 18.

In accordance with the present invention the indicating instrument is provided with a pair of weighted levers 19 and 20 which are pivotally mounted within the frame to swing in a horizontal plane, and the arrangement is such that these levers normally lie in the inactive position shown in full lines in Fig. 5, but when the movement of the instrument in a right-hand direction viewing Fig. 5 is checked, the momentum of the weighted levers will cause them to swing to the dotted position of Fig. 5 and this movement of the levers will operate an indicating disk to be described.

One feature of the invention resides in the construction whereby the various operating parts may be mounted in a small casing and to this end the levers 19 and 20 are pivotally mounted in the casing so that each extends from one side of the casing to the other in overlapping relation, as shown in Figs. 2 and 5. Due to this manner of mounting the levers the width of the casing need not be much greater than the length of a single lever.

The means shown for pivotally supporting the levers 19 and 20 so that they will swing in a horizontal plane within the frame, consists of vertical shafts 21 and 22 mounted in spaced relation to each other at opposite sides of the longitudinal axis of the casing. The shafts 21 and 22 are shown as having reduced ends which are journaled in jewel bearings mounted in the bearing nuts 23 which are screwed into threaded holes formed in the plates 13 and 14 of the frame. The shaft 21 is provided with a hub 24 rigidly secured thereto, and the inner end of the lever 20 is rigidly secured to this hub, as is also the gear 25. The inner end of the lever 19 is rigidly secured to a hub 26 rigidly secured to the shaft 22, and this hub is provided with a gear 27 which meshes with the gear 25, and the hub is also provided with a segmental gear 28 which is rigidly secured to the hub between the lever 19 and gear 27. It should be noted that the lever 19 swings in a plane above the lever 20 and the lever 19 is therefore secured to the upper portion of the hub 26, while the lever 20 is secured to an intermediate portion of the hub 24, and the levers 19 and 20 are provided with the enlarged outer ends 19ᵃ and 20ᵃ forming weights which causes the levers to swing in a right-hand direction under the action of momentum.

Various means might be provided for indicating the movement imparted to the levers 19 and 20 when the brakes of an automobile are being tested, and in the construction shown the indicating means consists of a disk 29 the upper face of which is graduated as shown in Figs. 1 and 5, and this disk is preferably provided with a downwardly extending flange portion 30 for a purpose to be described. The construction of the disk 29 is such that it may be easily stamped out of sheet metal, and the disk is supported within the frame to rotate in a horizontal plane by the vertical shaft 31, the upper end of which is received in a jewel bearing nut 32 similar to the nuts 23, while the lower end of this shaft is mounted in a jewel bearing nut 33. The means shown for rigidly securing the disk 29 to the shaft 31 consists of a hub 34 which is rigidly secured to the shaft 31, and a collar 35 which confines the central portion of the disk 29 between the upper end of the collar 35 and a flange portion of the hub 34. Rotative movement is imparted from the swinging levers 19 and 20 to the shaft 31 by the segmental gear 28 that meshes with a pinion 36 rigidly secured to the shaft 31.

It is important that means be provided for normally holding the weighted levers in the position shown in full lines in Fig. 5 so that they are always in position to swing in a right-hand direction when a test is being taken; the shaft 31 is therefore provided with the hair spring 37 which is coiled about the shaft 31 and the inner end of this spring is secured to the hub 38 which tightly embraces the shaft 31. The outer end of this spring, in the construction shown, is secured to the adjustable bracket 39. This bracket is conveniently formed of sheet metal having a horizontally extending portion in which a central hole is formed to receive an enlarged portion 40 of the jewel nut 33, and this enlarged portion forms a pivot about which the bracket 39 may be swung in adjusting the same.

The left-hand end of this bracket is provided with an upstanding portion 41 to which the outer end of the hair spring is secured by the screw 42 which confines the end of the hair spring between the inner face of the plate 41 and a nut 43. The right-hand end of the bracket 39 is provided with an enlarged portion 44, as best shown in Fig. 5, in which the arcuate slot 45 is formed, and the bracket 39 may be clamped in different positions of adjustment by tightening the screw 46 extending thru the curved slot 45. By arranging the weighted levers 19 and 20 as shown, one lever may rest against the hub 24 as a stop, while in its inactive position, and the other lever may rest against the hub 26 as a stop, as will be apparent from Fig. 5.

Since the weighted levers and disk 29 are supported by jewel bearings, they will rotate with very little friction and it is desirable to provide means for preventing them from oscillating back and forth to such an extent that the readings may be difficult to note. Damping means is therefore provided for reducing the rocking or vibratory movement of the disk 29 and to this end a permanent magnet, preferably having the peculiar construction shown in Fig. 3, is mounted within the frame so that the downwardly extending flange portion of the disk 29 will rotate between the poles of the magnet. This magnet, as will be apparent from Fig. 3, consists of a lower arm 47, and an upper arm 48, which is held in spaced relation to the lower arm by the upright portion 49 of the magnet, and it will be noted that the intermediate portion of the arms 47 and 48 are bent in the arc of a circle, this being desirable to clear the support for the lower end of the shaft 31, and also to increase the magnetic effect of the upper arm 48 upon the disk 29. The upper arm 48 is provided with the end or pole 50, while the lower arm 47 is provided with the upwardly bent end or pole 51, and, as above stated, the flange portion 30 of the disk rotates between the poles 50 and 51. The magnet is readily secured to the lower base plate by screws 52 mounted in the screw holes 53.

It is desirable that the construction of the present instrument be such that the reading may be noted by looking down upon the instrument from a position above the same, and to this end the upper portion 11 of the casing is provided with the sight opening 54, and this sight opening is formed in a depressed portion of the cover 11, adapted to receive the sight glass 55, and the glass retaining plate 56 in which is formed the sight opening 57. A zero plate 58 is preferably mounted between the sight glass 55 and the upper face of the receptacle 11 and this zero plate is provided with the opening 59 and has the reading point 60 painted or otherwise formed on its upper face to indicate where the reading is to be taken.

The casing forming sections 10 and 11 are conveniently secured together by the bolts 61, the upper ends of which may be countersunk in the upper box portion 11, and these bolts may extend downwardly thru holes formed in the plates 13 and 14 and thru the lower box portion 10 to receive the nuts 62 which nuts form feet adapted to support the indicating instrument. One of these bolts 61 serves to secure one side of the glass retaining plate 56 in place, while a slightly different bolt 63 serves to retain the opposite side of the plate 56 in place. The bolt 63 differs from the bolts 61 in that the former extends upwardly a slight distance from the upper face of the glass retaining plate 56 to form a stop for the cover plate to be described.

It is desirable to provide a cover plate for protecting the glass 55 to prevent this glass from being broken when the instrument is not in use, and in accordance with the present invention a cover plate 64 is pivotally mounted upon the upper face of the box section 11 by the pivot pin or rivet 65. The arrangement is such that when the instrument is in use the cover plate 64 is rotated to the position shown in full lines in Figs. 1 and 6, and when the instrument is not in use the cover may be rotated to the position shown in dotted lines in Fig. 6. When the instrument is not being used it is desirable to hold the operating parts against movement so that they will not swing back and forth, and to this end, in accordance with the present invention, means for frictionally holding the disk 29 from rotation is provided, and the arrangement is such that this holding means is automatically moved into holding engagement with the disk as the cover is moved to the position shown in dotted lines in Fig. 6, and releases the disk 29 when the cover is moved to the open position shown in Fig. 1. Various means might be provided that is adapted to be operated by the cover plate 64 to hold the disk 29 against movement, and in the construction shown this is accomplished by providing the stop spring 66, one end of which is rigidly secured to the upper face of the plate 14 by the screw 67, and the opposite end of this spring is provided with a downwardly bent portion 68 which is adapted to frictionally engage the upper face of the disk 29, and an opening 69 is formed in the plate 14 to permit the end 68 of the spring to engage the disk. An intermediate portion of the spring 66 is humped upwardly as at 70 and this portion is engaged by the cam 71 having the cam face 72 which upon rotation of the cam forces the spring downwardly into frictional engagement with the disk 29. The cam 71 is rotatably secured to the inner face of the box 11 and is provided with the upwardly extending rivet 65 which serves to pivotally secure the cover plate 64 to the casing. It should be noted that this rivet has a slabbed off face 73 which is engaged by a portion of the cover plate to positively rotate the cam when the cover plate is rotated. The construction of the stop spring 66 is such that it will spring upwardly out of engagement with the disk 29 when it is not forced downwardly by the cam surface 72.

Figure 6:
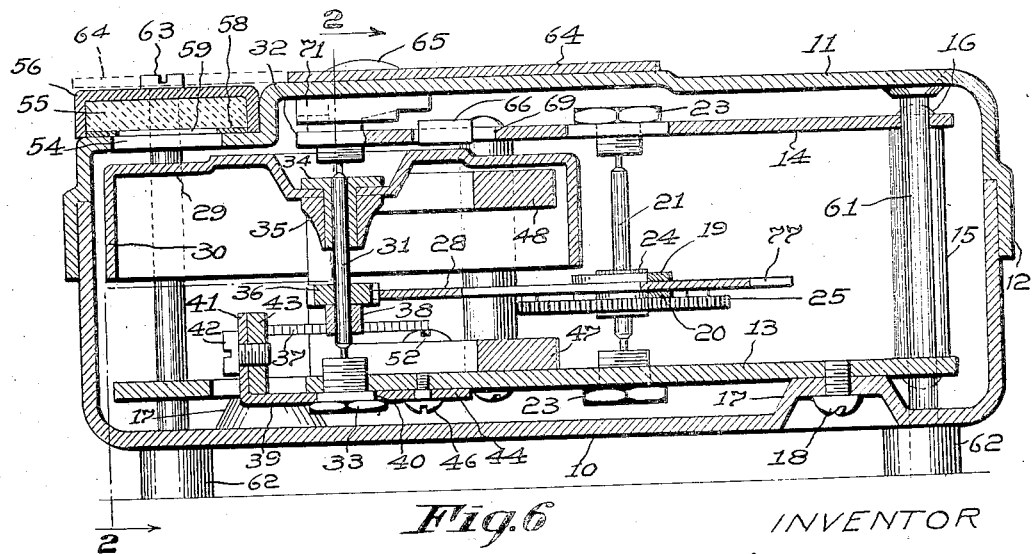
Fig. 6 is a sectional view taken on the line 6—6 of Fig. 5.

It is desirable to provide means for yieldingly locking the cover plate 64 in the inoperative position shown in Fig. 1, and also in the operative position shown in dotted lines in Fig. 6, and to this end in the construction shown the cam 71 has two small notches 74 formed in its under face, and a lock spring 75, which is secured to the upper face of the plate 14 by the screw 76, has an upwardly extending portion near its resilient outer end that is adapted to snap into one of the notches 74 to hold the cover in its open position, or into the second notch 74 to hold the cover in its closed position, and the upstanding head of the screw 63 will also serve as a stop to limit the rotation of the cover plate in one direction. When the indicating instrument is in use it is important that the proper end of the box shall extend in the direction in which the automobile travels and the upper face of the casing is therefore preferably provided with an arrow or other indicating means which may be marked "Direction of motion" as shown in Fig. 1.

In some cases a single weighted lever might be employed in place of the two levers shown, but a pair of cooperating levers such as shown is highly desirable, because if a single lever is employed any inclination of the instrument from the horizontal position will cause the lever to swing or tend to swing about its pivot, thus causing the instrument to read incorrectly, but by employing the cooperating levers 19 and 20, which are operatively connected by the gears 25 and 27, movement of a lever in one direction will impart a corresponding movement to the other lever in the opposite direction. As a result the accuracy of the operation of the instrument is not affected by tilting the same from a horizontal plane, as the action of gravity upon one weighted lever will be counteracted by a corresponding action upon the other lever which is transmitted to the first lever in the opposite direction by the cooperating gears 25 and 27. The segmental gear 28 for imparting the movement of the weighted levers to the indicating means has a counterbalancing portion 77.

From the foregoing description, when read in connection with the drawings, it will be seen that many of the parts described may be easily formed of sheet metal to reduce the cost of construction, and it will also be seen that the complete instrument is small and compact so that it may be easily carried by a police officer or other person whose duty it is to test the brakes of automobiles.

In taking a test all that is necessary is to place the instrument on the floor or running board of the automobile; then when the automobile is traveling at a predetermined speed, say twenty miles per hour, apply the brakes hard and note the reading of the graduations thru the sight opening as the automobile comes to rest. The reading of the instrument may indicate the feet the automobile travels before coming to rest, or other information, as may be desired.

What is claimed is:—

1. An instrument for testing the brakes of an automobile, comprising in combination, a casing, a pair of oppositely extending weighted levers pivotally mounted in overlapping relation to each other in the casing to swing in horizontal planes, cooperating gears actuated by said levers to impart the swinging movement of one lever to the other, a spring for normally holding the levers in a predetermined position, an indicating disk rotatably supported by the casing, and operating means between the disk and levers for rotating the former to indicate the swinging movement imparted to the latter.

2. An instrument for testing the brakes of an automobile, comprising in combination, a casing, a pair of weighted levers pivotally mounted in the casing to extend in opposite directions and positioned so that one lever may swing over the other in overlapping relation thereto, cooperating gears for imparting the swinging movement of one lever to the other, and indicating means operatively connected to said levers and actuated by the swinging movement of the levers to indicate their movement.

3. An instrument for testing the brakes of an automobile, comprising in combination, a casing, a pair of vertical shafts mounted in the casing in spaced relation, a weighted lever mounted upon each shaft to swing in a horiontal plane and each positioned to extend toward the shaft of the other lever so that one lever may lie in overlapping relation to the other, cooperating means for imparting the movement of one lever to the other, and indicating means actuated by the levers to indicate their swinging movement.

4. An instrument for testing the brakes of an automobile, comprising in combination, a casing, a pair of vertical shafts mounted in the casing in spaced relation, a weighted lever mounted upon each shaft to swing in a horizontal plane and each positioned to extend past the shaft of the other lever, spring means for normally holding each lever in abutting engagement with the shaft of the other lever, cooperating means for imparting the swinging movement of one lever to the other, and indicating means actuated by the levers to indicate their swinging movement.

5. An instrument for testing the brakes of an automobile, comprising in combination, a frame, a pair of vertical shafts rotatably supported by the frame, a weighted lever secured to each shaft to swing in a horizontal plane, cooperating gears for transmitting the movement of one lever to the other, an indicating disk rotatably supported by the frame and operated by the movement of one of said levers to indicate the extent of said movement, and a casing for enclosing said frame and having an observation window in its upper face.

6. An instrument for testing the brakes of an automobile, comprising in combination, a casing having an observation window, a weighted lever swingingly mounted in the casing, a disk rotatably mounted within the casing and constructed to be rotated by the swinging movement of the lever, a disk engaging element for holding the disk from rotating, a cover for said window, and means actuated by the movement of the cover to effect engagement of said element with the disk.

7. An instrument for testing the brakes of an automobile, comprising in combination, a casing having an observation window, a weighted lever swingingly mounted in the casing, an indicator actuated by the movement of the lever to move past the window, a cover for said window movable to and from its closed position, and means operable by the movement of the cover to hold the indicator inactive.

8. An instrument for testing the brakes of an automobile, comprising in combination, a casing having an observation window, a weighted lever swingingly mounted in the casing, an indicator actuated by the movement of the lever to move past the window, a cover for the window movable to and from its closed position, and means controlled by the cover to hold the indicator inactive when the cover is closed and to release the indicator when the cover is open.

9. An instrument for testing the brakes of an automobile, comprising in combination, a casing having an observation window, a weighted lever swingingly mounted in the casing, an indicator actuated by the lever to move in front of the window, a cover pivotally secured to the casing to move to and from the closed position, and means constructed to be moved into holding engagement with the indicator as the cover is rotated to its closed position.

10. An instrument for testing the brakes of an automobile, comprising in combination, a casing having an observation window, a weighted lever swingingly mounted in the casing, an indicator actuated by the movement of the lever to move past the window, a cover for the window rotatably mounted upon the casing, a cam rotated by the movement of the cover to and from its closed position, and means operable by said cam to hold the indicator against movement.

11. An instrument for testing the brakes of an automobile, comprising in combination, a frame, a weighted lever swingingly mounted in the frame, a disk rotatably mounted upon the frame and having an annular flange portion extending at right angles to the plane of the disk, operating means for imparting movement of the lever to the disk to rotate the latter, and a magnet having its opposite poles in close proximity to each other and positioned so that the annular flange portion of the disk rotates between the poles while both poles lie on one side of the plane of said disk.

12. An instrument for testing the brakes of an automobile, comprising in combination, a frame, vertical shafts supported by the frame in lateral spaced relation, a weighted lever mounted upon each of the shafts to swing in a horizontal plane and one of the levers being supported in a plane above the other so that one lever may swing over the other, spring means for normally holding the levers in a position to swing frontwardly under the action of momentum, and means for indicating the swinging movement of the levers from their normal position.

13. An instrument for testing the brakes of an automobile, comprising in combination, a casing, a pair of weighted levers pivotally mounted in overlapping relation to each other in the casing to swing in a horizontal plane and arranged to extend from one side of the casing to the other in opposite directions, means for imparting the swinging movement of one lever to the other, and indicating means actuated by the levers to indicate their movement.

14. An instrument for testing the brakes of an automobile, comprising in combination, a casing, a pair of weighted levers pivotally mounted in overlapping relation to each other in the casing to swing in a horizontal plane under the action of momentum, gears secured to said levers and meshing to impart the swinging movement of one lever to the other, rotating indicating means supported by the casing, and cooperating gears for imparting the movement of the levers to the indicating means to actuate the latter.

In testimony whereof, I have signed my name to this specification.

CHARLES F. COWDREY.